(12) United States Patent
Maine

(10) Patent No.: US 7,603,661 B2
(45) Date of Patent: Oct. 13, 2009

(54) PARSE TABLE GENERATION METHOD AND SYSTEM

(75) Inventor: Dale W. Maine, Simsbury, CT (US)

(73) Assignee: Hamilton Sunstrand, Windsor Locks, CT (US)

( * ) Notice: Subject to any disclaimer, the term of this patent is extended or adjusted under 35 U.S.C. 154(b) by 1258 days.

(21) Appl. No.: 10/354,355

(22) Filed: Jan. 30, 2003

(65) Prior Publication Data

US 2004/0154005 A1    Aug. 5, 2004

(51) Int. Cl.
  *G06F 9/44*   (2006.01)
  *G06F 9/45*   (2006.01)
(52) U.S. Cl. .................. 717/132; 717/133; 717/143; 717/144
(58) Field of Classification Search .......... 717/140–144
  See application file for complete search history.

(56) References Cited

U.S. PATENT DOCUMENTS

| | | | | |
|---|---|---|---|---|
| 4,686,623 A | * | 8/1987 | Wallace | 717/143 |
| 5,530,863 A | * | 6/1996 | Hino | 717/146 |
| 5,649,215 A | * | 7/1997 | Itoh | 704/9 |
| 5,930,795 A | * | 7/1999 | Chen et al. | 707/100 |
| 6,206,584 B1 | * | 3/2001 | Hastings | 714/35 |
| 6,272,495 B1 | * | 8/2001 | Hetherington | 707/101 |
| 6,463,565 B1 | * | 10/2002 | Kelly et al. | 716/1 |
| 2004/0107217 A1 | * | 6/2004 | Hastings | 707/104.1 |

* cited by examiner

*Primary Examiner*—Chuck O Kendall
(74) *Attorney, Agent, or Firm*—Carlson, Gaskey & Olds PC

(57) ABSTRACT

A method and system assembles state transition tables (100) from a plurality of modular sub-tables (102). In one embodiment, each sub-table (102) defines an individual statement in a programming language. Combining multiple sub-tables (102) together into one large table (100) creates a dictionary for a programming language that can be used to, for example, compile code into the programming language or translate code from one language to another. Using sub-tables (102) simplifies construction of the larger table (100) and makes it easier to add, modify, or remove portions of the table (102).

12 Claims, 3 Drawing Sheets

| TABLE | SINGLESELECT(A:J) | | | φ | VALUES | FROM | SET | WHERE | INSERT | UPDATE |
|---|---|---|---|---|---|---|---|---|---|---|
| BEGIN | A:36 | | | | | | | | F:52 | E:52 |
| A | 0 | 0 | . | 0 | 0 | 0 | 0 | 0 | | |
| B | B | 0 | 0 | 0 | 0 | 0 | 0 | 0 | | |
| C | 0 | C:38 | 0 | A:37 | 0 | 0 | 0 | 0 | | |
| D | 0 | D:37 | 1:39 | 0 | 0 | I:37 | 0 | 0 | | |
| E | 0 | D:56 | 1:39 | D:37 | 0 | I:37 | 0 | 0 | | |
| F | 0 | E:53 | 1:54 | D:37 | 0 | I:37 | 0 | 0 | | |
| G | 0 | F:53 | 1:54 | E:53 | 0 | 0 | 0 | 0 | | |
| H | 0 | G:55 | 1:54 | F:53 | G:53 | 0 | G:53 | G:53 | | |
| I | 0 | 0 | 1:54 | G:53 | | | | | | |
| I | 0 | J:01 | 0 | 0 | | | | | | |
| J | 0 | J:37 | 1:37 | D:37 | | | | | | |
| | 0 | J:37 | 1:37 | D:37 | | | | | | |
| END | | | | | | | | | | |

Fig-2A

PARSE TABLE GENERATION METHOD AND SYSTEM

TECHNICAL FIELD

The present invention relates to state transition tables, and more particularly to a state transition table constructed from a plurality of sub-tables.

BACKGROUND OF THE INVENTION

Code compilers and code translation systems, such as the translation system described in commonly-assigned, co-pending U.S. application Ser. No. 10/354,356, the disclosure of which is incorporated by reference in its entirety, often use state transition tables for defining outputs corresponding to given inputs. For example, a compiler may receive a data item and access a state transition table based on the data item's type and the current state to obtain a new state and an action (if any) to perform on the data item.

As the number of possible states and data item types increases, however, the state transition table becomes large and unwieldy. Editing the table is impractical due to its size, and it can be difficult to add new functions to the table to accommodate new data items or change table actions for old data items. Further, constructing large tables in the first instance is often difficult because it requires a programmer to keep track of many variables at once, providing no mechanism for dividing the task into smaller parts.

There is a desire for a system that can simplify the creation and maintenance of state transition tables.

SUMMARY OF THE INVENTION

Accordingly, one embodiment of the invention is directed to a method and system that generates state transition tables from a plurality of modular sub-tables. In one embodiment, each sub-table defines an individual statement in a programming language. Combining multiple sub-tables together into one large table therefore creates a dictionary for a programming language that can be used to, for example, compile code into the programming language or translate code from one language to another.

By constructing a state transition table from multiple sub-tables, the invention makes it easier to construct and edit large tables containing many statements. New statements may also be added to the table easily by incorporating additional sub-tables into the large table.

BRIEF DESCRIPTION OF THE DRAWINGS

FIGS. 2A and 2B illustrate examples of possible sub-tables created according to one embodiment of the invention.

DETAILED DESCRIPTION OF THE EMBODIMENTS

Figure 1:
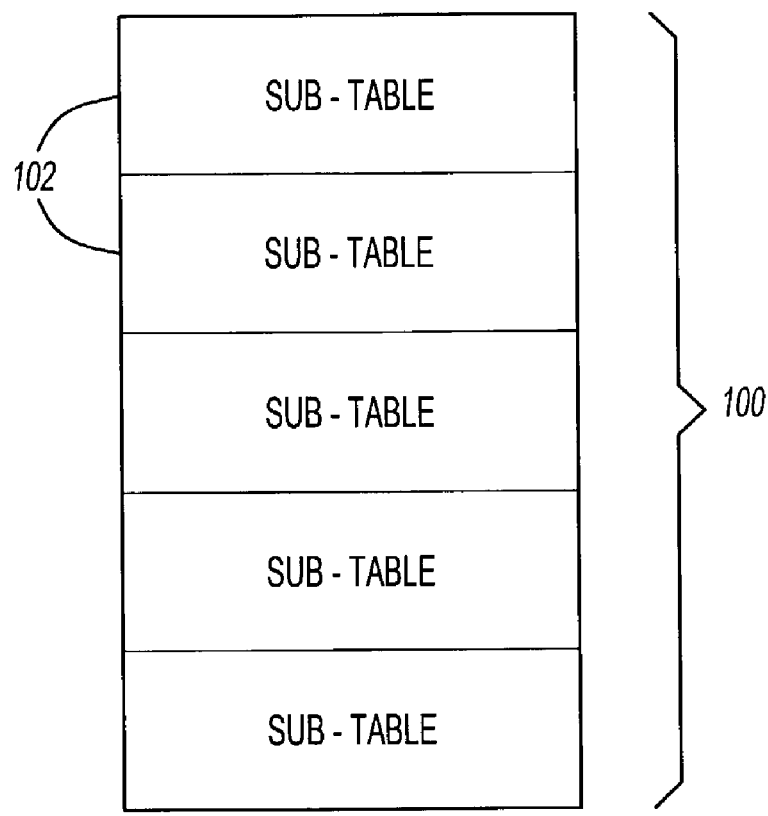
FIG. 1 is a representative block diagram illustrating a table structure generated according to one embodiment of the invention.

FIG. 1 is a block diagram representing a table 100 generated according to one embodiment of the invention. The table 100 is generally a state transition table similar to those known in the art. In the invention, however, the table 100 is constructed from two or more sub-tables 102, each sub-table 102 acting as a building block for the overall table 100. In one embodiment, each sub-table 102 defines a particular programming statement or syntax for a given programming language. More particularly, each sub-table 102 for a given statement or syntax contains only words and symbols, or "tokens", necessary to define that statement or syntax. All of the sub-tables 102 taken together define a group of statements and syntaxes and therefore act as a dictionary for a complete programming language.

Figure 2B:
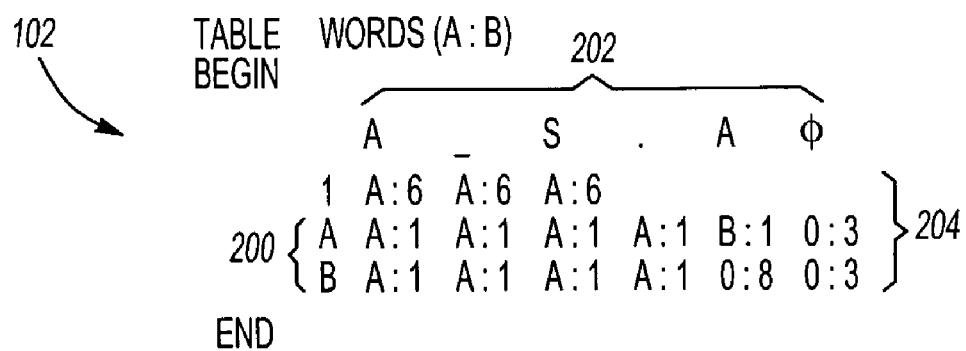

FIGS. 2A and 2B are examples of possible sub-tables 102 used in the invention. These particular examples define terms found in PL/SQL language, but any language may be defined by the sub-tables 102 without departing from the scope of the invention. FIG. 2A illustrates a sub-table 102 defining a SELECT statement in PL/SQL language, while FIG. 2B illustrates a sub-table 102 defining a keyword builder that may be used by, for example, a scanner that receives a plurality of characters and builds words or statements corresponding to a given language from those characters. Although the description below will focus on the example shown in FIG. 2A, the same principles apply to both FIGS. 2A and 2B.

Referring to FIG. 2A, the sub-table 102 defines a plurality of lettered relocatable states 200. The states 200 in the sub-table 102 are relocatable because the final state positions within the overall table 100 are unknown at the time the sub-tables 102 are written. In one embodiment, each sub-table 102 starts with an initial state 201 (defined as "state 1" in this example) and the token(s) that would be found at the beginning of the statement defined by the sub-table 102. For example, as shown in FIG. 2A, a SELECT statement would normally begin with the word SELECT, and therefore a parse tool would carry out the action defined at the SELECT token in state 1 first.

The sub-table 102 also maps one or more possible tokens 202 that define the statement or syntax described by the sub-table 102. In the example shown in FIG. 2A, the SELECT statement may be defined by keywords such as INTO, VALUES, FROM and SET as well as punctuation marks or a program variable ("A" in this example). The sub-table 102 may also include a default token (Φ in this example) that represents a default transition to cover any token/state combinations not explicitly mapped in the sub-table 102. In one embodiment, the sub-table 102 only maps tokens 202 that require unique actions and provides the default token to handle all other received tokens. This allows the sub-table 102 to be kept relatively short and simple while still including a general token/state combination to handle any unexpected situations.

For at least one state 200, 201 and token 202 combination, the sub-table 102 defines a state change and/or action 204. When the table 100 is being used (e.g., during a scanning, parsing, or compiling operation), each operation will start in a given fixed state 1. The next token found determines the next state transition, which would lead to states in one of the sub-tables 102. For example, if a parsing tool receives a SELECT statement, the transition from state 1 would direct the parsing tool to the first relocatable state ("A") from the sub-table 102 corresponding to the SELECT statement. In this case, the sub-table 102 instructs the tool to change the current state to state A and carry out action 36 (an action defined in, for example, an action table or code generator). The tool then continues receiving additional tokens, changing state and carrying out actions based on the received tokens and the current state. If the action corresponding to a present state/token combination is zero or blank in the sub-table 102, the tool may carry out the default transition for that state. When the parsing action for a given statement is complete, the parsing tool returns to state 1 and readies itself to receive another statement and access the sub-table 102 corresponding to the statement.

When the sub-tables 102 are assembled together to form the complete table 100, the lettered relocatable states 200 defined in the sub-tables 102 may be redefined as numerical states in the context of the overall array. For example, states A through F in the SELECT statement (FIG. 2A) may be redefined as states 81 through 86 in the overall table 100 if there are 80 other states defined in sub-tables 102 appearing in the table 100 before the SELECT statement sub-table. The references to the lettered relocatable states corresponding to actions 204 in the sub-tables 102 are mapped to these numerical states. For example, if the sub-table directs a transition to state B, it would be stored as a reference to state 82 in this example. Thus, each state in the overall table 100 will have its own unique state number.

Constructing the overall table 100 using sub-tables 102 makes it easy to add programming terms as the need arises because each sub-table 102 is a discrete module that can be independently generated and incorporated into the main table 100. Breaking the table 100 into sub-tables 102 makes it easier to edit the table 100 and to keep programming of the overall table 100 organized as well. Modifying the table 100 would entail only identifying the particular statement requiring modification, locating the sub-table 102 associated with that statement, and editing the sub-table 102. The resulting edited table 100 may then be recompiled if needed to accommodate the changes to the sub-table 102 (e.g., renumber the states).

Figure 3:
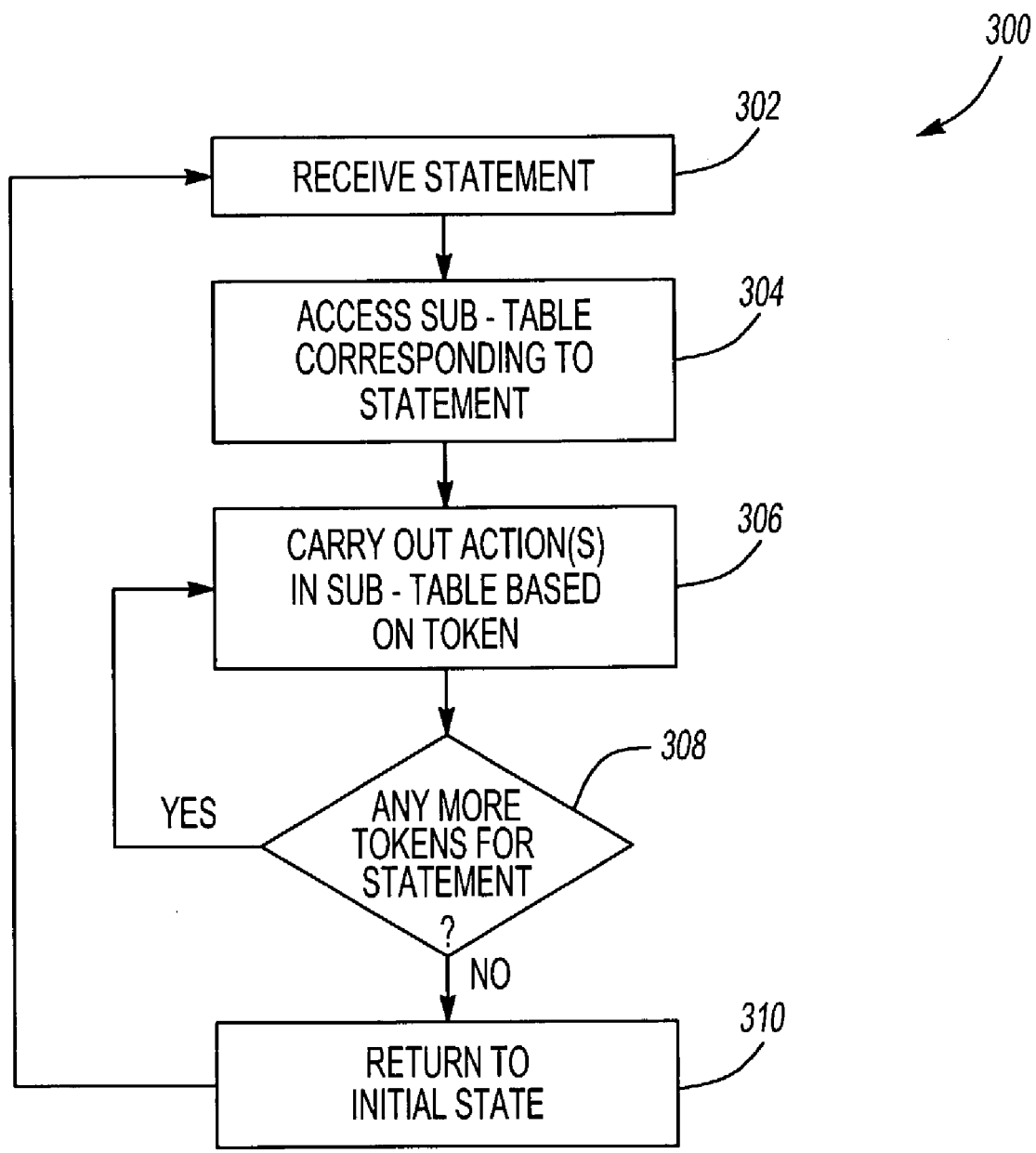
FIG. 3 is a flow diagram illustrating a process using a table constructed according to one embodiment of the invention.

FIG. 2B incorporates concepts similar to those described above in FIG. 2A, but the sub-table 102 in FIG. 2B is used to build strings, such as keywords, that may themselves be incorporated into another sub-table. Where the resulting table from FIG. 2A would be used by a parser, the table from FIG. 2B would be used by a scanner, a lower-level operation where tokens are formed from the input language being processed. The resulting tokens could then be the input to a parser and recognized as keywords or other higher-level tokens FIG. 3 is a flow diagram illustrating one example of a process 300, such as a parsing, scanning, or compiling process, that accesses a table 100 constructed according to one embodiment of the invention. As noted above, the table 100 contains a plurality of sub-tables 102. When an application tool, such as a parser, scanner or compiler, receives a statement (block 302), it accesses the sub-table corresponding to that statement, starting at the initial state (e.g., state 1) in that sub-table (block 304). The tool then receives individual tokens corresponding to the statement and carries out actions based on each token and the current state, as explained above (block 306). Once an action for a token is carried out, the tool continues to process additional tokens for the current statement (block 308) until it reaches the end of the statement and the table directs return to return to the initial state (block 310). It would continue to process tokens, parsing a new statement (block 302) and would access the sub-table corresponding to the new statement. In essence, each sub-table 102 acts like a sub-routine for a larger programming application, with the tool accessing individual, independent sub-tables 102 as needed.

As a result, the invention creates state transition tables by defining individual sub-tables that can later be assembled to complete a complete table, such as a parse table, scanner table, or compiler table. The constructed tables can be used in any application that uses state transition tables, such as compilers or code translation systems. As is known, compliers translate a computer program written in one computer language into an equivalent program written in another computer language. Compliers and code translation systems arc typically stored on a computer readable medium to provide access to the translation function. Further, the inventive modular technique can be used as a tool to create other programs.

Note that although the above example discusses a parse table, the same technique can be used to construct any state transition table (e.g., an action table, a scanner table, etc.) that has two-dimensional arrays containing actions for a plurality of different states and possible token types and that can be broken down into independently-accessible sub-tables.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A state transition table defining a plurality of statements in a programming language, each statement defined by at least one token, comprising:
 a table defining an array of states;
 a plurality of sub-tables associated with said table, each sub-table corresponding to one of said plurality of statements and including at least one relocatable state that changes in response to said sub-table being assembled within said table, wherein each sub-table is a two-dimensional array defining an action for at least one token in at least one state; and
 a software module operable to output a state in response to an input, wherein the table, plurality of sub-tables, and software module are stored on a computer.

2. The state transition table of claim 1, wherein at least one sub-table contains a default token representing a default action.

3. The state transition table of claim 1, wherein said at least one state in the sub-table is initially defined as a relocatable state.

4. The state transition table of claim 3, wherein said at least one relocatable state is redefined when the plurality of sub-tables are assembled to form the state transition table.

5. The state transition table of claim 1, wherein each sub-table has an initial state at which access of the sub-table begins.

6. The state transition table of claim 1, wherein the state transition table is one selected from the group consisting of a scanner table, a parser table, and a compiler table.

7. A method for accessing a state transition table defining a plurality of statements in a programming language, each statement defined by at least one token, comprising:
 receiving one of said plurality of statements;
 accessing a sub-table corresponds to the received statement, wherein the accessed sub-table corresponds to the received statement, wherein the accessed sub-table includes at least one relocatable state that changes in response to the sub-table being assembled within the state transition table, wherein the accessed sub-table is a two-dimensional array defining an action for at least one token in at least one state, and wherein the state transition table and sub-table are stored on a computer readable medium on a computer;
 receiving on the computer a token corresponding to the received statement; accessing the sub-table corresponding to the received statement based on the received token and a current state; and carrying out an action corresponding to the received token and the current state via a software module stored on the computer readable medium on the computer.

8. The method of claim 7, further comprising:
receiving a second one of said plurality of statements; and
accessing a second sub-table corresponding to the second received statement.

9. The state transition table of claim 1, wherein the input corresponds to code in a first programming language, and the output corresponds to code in a second programming language.

10. The state transition table of claim 9, wherein the first programming language corresponds to source code and the second programming language corresponds to compiled object code.

11. The state transition table of claim 1, wherein the software module is also operable to output an action.

12. The state transition table of claim 11, wherein the action is a SELECT statement defined by at least one keyword selected from the group consisting of INTO, VALUES, FROM, and SET.

* * * * *

UNITED STATES PATENT AND TRADEMARK OFFICE
CERTIFICATE OF CORRECTION

| | |
|---|---|
| PATENT NO. | : 7,603,661 B2 |
| APPLICATION NO. | : 10/354355 |
| DATED | : October 13, 2009 |
| INVENTOR(S) | : Dale W. Maine |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1600 days.

Signed and Sealed this

Fifth Day of October, 2010

David J. Kappos
*Director of the United States Patent and Trademark Office*